United States Patent
Yang et al.

(10) Patent No.: US 12,028,106 B2
(45) Date of Patent: Jul. 2, 2024

(54) COMMUNICATION DEVICE AND METHOD, AND UNMANNED AERIAL VEHICLE EMPLOYING THE SAME

(71) Applicant: ELECTRONICS AND TELECOMMUNICATIONS RESEARCH INSTITUTE, Daejeon (KR)

(72) Inventors: Jeong Gi Yang, Daejeon (KR); Soo Jeon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 13 days.

(21) Appl. No.: 18/101,775

(22) Filed: Jan. 26, 2023

(65) Prior Publication Data
US 2023/0254005 A1 Aug. 10, 2023

(30) Foreign Application Priority Data
Feb. 4, 2022 (KR) ................. 10-2022-0015117

(51) Int. Cl.
*H04B 1/69* (2011.01)
*B64C 39/02* (2023.01)
(Continued)

(52) U.S. Cl.
CPC ............ *H04B 1/69* (2013.01); *B64C 39/024* (2013.01); *B64U 20/80* (2023.01); *G01S 11/02* (2013.01); *B64U 2101/20* (2023.01)

(58) Field of Classification Search
CPC ........ H04B 1/69; B64C 39/024; B64U 20/80; B64U 2101/20; B64U 2201/20;
(Continued)

(56) References Cited

U.S. PATENT DOCUMENTS 10,939,406 B1 * 3/2021 Wu .................. G01S 5/0242
11,059,584 B1 * 7/2021 Nam ................. B64C 39/024
(Continued)

FOREIGN PATENT DOCUMENTS

KR 10-2016-0137442 A 11/2016
KR 10-2018-0042693 A 4/2018
(Continued)

*Primary Examiner* — Sung S Ahn
(74) *Attorney, Agent, or Firm* — LRK PATENT LAW FIRM

(57) ABSTRACT

The present disclosure provides a communication device which is suitable for use in an unmanned aerial vehicle operating in an unmanned aerial vehicle collaboration system including multiple unmanned aerial vehicles and enables both a data communication with another unmanned aerial vehicle and a measurement of a distance to another unmanned aerial vehicle. According to an aspect of an exemplary embodiment, a communication device of an unmanned aerial vehicle includes: an ultra-wideband (UWB) communication circuit configured to perform a UWB communication with other unmanned aerial vehicle; and a UWB communication manager configured to send transmit data to the other unmanned aerial vehicle and receive data sent by the other unmanned aerial vehicle through the UWB communication circuit, and transmit or receive shared data to be shared by unmanned aerial vehicles in a form of being appended to a distance measurement frame.

19 Claims, 4 Drawing Sheets

(51) Int. Cl.
*B64U 20/80* (2023.01)
*B64U 101/20* (2023.01)
*G01S 11/02* (2010.01)

(58) Field of Classification Search
CPC .... G01S 11/02; G01S 13/0209; G01S 13/765; H04W 4/40; H04W 4/023; H04W 4/06; H04W 4/80; H04W 80/10; H04W 84/06; H04W 88/02
See application file for complete search history.

(56) References Cited

U.S. PATENT DOCUMENTS

| | | |
|---|---|---|
| 11,206,047 B2 | 12/2021 | Park et al. |
| 2020/0150262 A1 | 5/2020 | Kim et al. |
| 2021/0181333 A1* | 6/2021 | Cheng .................. H04B 1/7163 |
| 2021/0287559 A1 | 9/2021 | Jeong et al. |
| 2021/0318693 A1 | 10/2021 | Lee et al. |
| 2022/0075392 A1 | 3/2022 | Kim et al. |

FOREIGN PATENT DOCUMENTS

| | | |
|---|---|---|
| KR | 10-2020-0013436 A | 2/2020 |
| KR | 10-2020-0097070 A | 8/2020 |
| KR | 10-2021-0097887 A | 8/2021 |
| KR | 10-2021-0102273 A | 8/2021 |
| KR | 10-2021-0114647 A | 9/2021 |
| KR | 10-2022-0012167 A | 2/2022 |
| WO | 2020/116949 A1 | 6/2020 |

* cited by examiner

COMMUNICATION DEVICE AND METHOD, AND UNMANNED AERIAL VEHICLE EMPLOYING THE SAME

CROSS-REFERENCE TO RELATED APPLICATION

The present application claims a convention priority under 35 U.S.C. § 119(a) based on Korean Patent Application No. 10-2022-0015117 filed on Feb. 4, 2022, the entire content of which is incorporated herein in its entirety by reference.

BACKGROUND

1. Technical Field

The present disclosure relates to a communication device and, more particularly, to a communication device mounted on an unmanned aerial vehicle. In addition, the present disclosure relates to a method for an unmanned aerial vehicle to communicate with another unmanned aerial vehicle, and an unmanned aerial vehicle apparatus employing the communication device.

2. Description of Related Art

An unmanned aerial vehicle (UAV) refers to an aerial vehicle operated by a remote control without a human being on board and is also referred to as a drone. The unmanned aerial vehicles are widely being used in various fields such as a reconnaissance and a search in a military field or a disaster recovery situation, an agricultural crop management, a forest fire monitoring, and a delivery of goods, and so on.

In some applications, multiple UAVs may operate simultaneously in collaboration to enlarge a scope of a task or improve a mission fulfillment efficiency. Examples of such applications may include an aggregation of sensor data, a detection of a disastrous situation such as a flood and a forest fire, an air show, and the like. In case of collaborating multiple UAVs in these application, it is desirable to accurately measure distances between any two UAVs and facilitate communications between the UAVs and between the UAV and a ground control system (GCS). In case that the distances between the unmanned aerial vehicles are inaccurate or the communication between the devices are not smooth, a mission failure may occur and one or more unmanned aerial vehicles may crash.

In particular, conventional UAV collaboration systems focus on either the distance measurement between the UAVs or communications among the UAVs. A collaboration system that ensures both the distance measurement between the UAVs and the communications among the UAVs has not been presented yet.

SUMMARY

Provided is a communication device which is suitable for use in an unmanned aerial vehicle operating in an unmanned aerial vehicle collaboration system including multiple unmanned aerial vehicles and enables both a data communication with another unmanned aerial vehicle and a measurement of a distance to another unmanned aerial vehicle.

Provided is a communication method, in an unmanned aerial vehicle operating in an unmanned aerial vehicle collaboration system including multiple unmanned aerial vehicles, that enables both the data communication with another unmanned aerial vehicle and the measurement of the distance to another unmanned aerial vehicle.

Provided is an unmanned aerial vehicle suitable for use in an unmanned aerial vehicle collaboration system including multiple unmanned aerial vehicles and capable of performing both the data communication with another unmanned aerial vehicle and the measurement of the distance to another unmanned aerial vehicle.

According to an aspect of an exemplary embodiment, a communication device of an unmanned aerial vehicle includes: an ultra-wideband (UWB) communication circuit configured to perform a UWB communication with other unmanned aerial vehicle; and a UWB communication manager configured to send transmit data to the other unmanned aerial vehicle and receive data sent by the other unmanned aerial vehicle through the UWB communication circuit, and transmit or receive shared data to be shared by unmanned aerial vehicles in a form of being appended to a distance measurement frame.

The UWB communication manager may include: a serial communication unit connected to a controller of the unmanned aerial vehicle through a serial communication; a transmit data processor configured to send a general data message including the transmit data to the other unmanned aerial vehicle through the UWB communication circuit according to an instruction from the controller and initiate a distance measurement to the other UAV; a receive data processor configured to receive a general receive data message sent by the other UAV and respond to a distance measurement procedure initiated by the other UAV; and a session manager configured to maintain and manage a list of unmanned aerial vehicles determined to be capable of performing the UWB communication and support a session management for the UWB communication.

The receive data processor may normally operate all the time, and the transmit data processor may be activated only when data transmission is required.

The communication device may further include a shared data buffer configured to store the shared data to be shared by the unmanned aerial vehicles to provide to the transmit data processor.

Message frames of the general data message and a distance measurement initiation message may include payload type data for distinguishing the general data message from the distance measurement initiation message. The receive data processor may provide the session manager with a source address of a received message when a destination address in a header of the received message is an address of the unmanned aerial vehicle itself comprising the receive data processor or a broadcast address.

The session manager may maintain a timer for determining whether a predetermined time has elapsed for each of the other unmanned aerial vehicles included in the list. An unmanned aerial vehicle from which any data has not been received within the predetermined time may be excluded from the list. The timer for an unmanned aerial vehicle from which data has been received within the predetermined time may be updated.

According to another aspect of an exemplary embodiment, a communication method in an unmanned aerial vehicle may include: sending a general data message comprising general data to other unmanned aerial vehicle through a ultra-wideband (UWB) communication, or receiving a general data message sent by the other unmanned aerial vehicle through the UWB communication; transmitting a distance measurement initiation message to the other unmanned aerial vehicle; receiving a response message to which responder device sharing data is attached from the other unmanned aerial vehicle; calculating a distance to the other unmanned aerial vehicle based on a difference between a transmission time of the distance measurement initiation message and a reception time of the response message; and generating a report message including the distance and initiator device sharing data to be shared with the other UAV and to transmit to the other UAV.

Message frames of the general data message and a distance measurement initiation message may include payload type data for distinguishing the general data message from the distance measurement initiation message.

The general data message may include information for distinguishing the general data message from a message requiring a response.

The communication method may further include: storing, in a predetermined storage, a list of unmanned aerial vehicles capable of performing communications; setting a timer for determining whether a predetermined time has elapsed for each of the unmanned aerial vehicles included in the list; excluding an unmanned aerial vehicle, from the list, that has not received data within the predetermined time; and updating the timer for the unmanned aerial vehicle from which data has been received within the predetermined time.

The communication method may further include broadcasting heartbeats to a plurality of unmanned aerial vehicles periodically.

The communication method may further include detecting a system identifier included in a received message and determining whether the system identifier is identical to an identifier of a system to which the unmanned aerial vehicle belongs.

At least one of the distance measurement initiation message, the response message, and the report message may include a service identifier indicating a service to be provided through a collaboration of a plurality of unmanned aerial vehicles.

According to yet another aspect of an exemplary embodiment, provided is an unmanned aerial vehicle capable of performing device-to-device communications with other unmanned aerial vehicles belonging to an unmanned aerial vehicle collaboration system including a plurality of unmanned aerial vehicles. The unmanned aerial vehicle includes: a controller configured to control a flight and a mission fulfillment of the unmanned aerial vehicle; a communication unit configured to enable the controller to communicate with a predetermined ground control system; an ultra-wideband (UWB) communication circuit configured to perform UWB communications with the other unmanned aerial vehicles; and a UWB communication manager configured to send transmit data to at least one of the other unmanned aerial vehicles and receive data sent by the other unmanned aerial vehicles through the UWB communication circuit, and transmit or receive shared data to be shared by the unmanned aerial vehicles in a form of being appended to a distance measurement frame.

The UWB communication manager may include: a serial communication unit connected to the controller through a serial communication; a transmit data processor configured to send a general data message including the transmit data to at least one of the other unmanned aerial vehicles through the UWB communication circuit according to an instruction from the controller and send a distance measurement initiation message to at least one of the other unmanned aerial vehicles; a receive data processor configured to receive a general data message sent by at least one of the other unmanned aerial vehicles and respond to a received distance measurement initiation message from at least one of the other unmanned aerial vehicles; and a session manager configured to maintain and manage a list of unmanned aerial vehicles determined to be capable of performing the UWB communication and support a session management for the UWB communication of the unmanned aerial vehicle.

The receive data processor may normally operate all the time, and the transmit data processor may be activated only when data transmission is required.

The unmanned aerial vehicle may further include a shared data buffer configured to store the shared data to be shared by the unmanned aerial vehicles to provide to the transmit data processor.

Message frames of the general data message and the distance measurement initiation message may include payload type data for distinguishing the general data message from the distance measurement initiation message. The receive data processor may provide the session manager with a source address of a received message when a destination address in a header of the received message is an address of the unmanned aerial vehicle itself comprising the receive data processor or a broadcast address.

The session manager may maintain a timer for determining whether a predetermined time has elapsed for each of the other unmanned aerial vehicles included in the list. An unmanned aerial vehicle from which any data has not been received within the predetermined time may be excluded from the list. The timer for an unmanned aerial vehicle from which data has been received within the predetermined time may be updated.

According to an exemplary embodiment of the present disclosure, a communication device in an unmanned aerial vehicle may perform both the data communication with another unmanned aerial vehicle and the measurement of the distance to another unmanned aerial vehicle. The communication device may measure the distance to another unmanned aerial vehicle accurately and quickly through the UWB communication. In addition, the communication device may transmit data instructed to transmit by the upper device to another unmanned aerial vehicle. Further, the communication device may transmit data to be shared with other unmanned aerial vehicles to the other unmanned aerial vehicles by attaching to a distance measurement frame, which enables an efficient data sharing among the unmanned aerial vehicles.

The communication device may adopt an asynchronous communication in consideration of a communication environment among the unmanned aerial vehicles that a network topology may continuously change. The communication device may have a primitive session management capability by maintaining the list of unmanned aerial vehicles. As a result, communications among the unmanned aerial vehicles may be facilitated, which may increase the efficiency of the unmanned aerial vehicle collaboration system.

Since the communication device may support a MAVlink protocol as well as a custom protocol, the present disclosure may enable a transmission or exchange of a telemetry data or a telecommand instruction among the unmanned aerial vehicles in addition to various microservices.

BRIEF DESCRIPTION OF THE DRAWINGS

In order that the disclosure may be well understood, there will now be described various forms thereof, given by way of example, reference being made to the accompanying drawings, in which.

Figure 1:
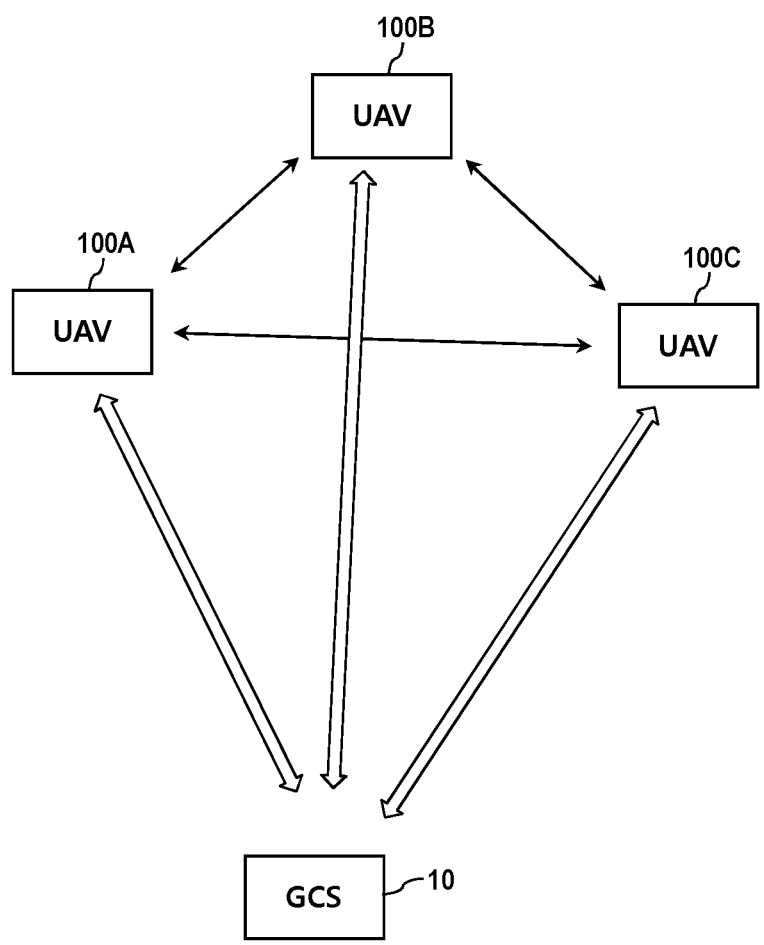
FIG. 1 is a schematic block diagram of an unmanned aerial vehicle collaboration system according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 is a schematic block diagram of an unmanned aerial vehicle collaboration system according to an exemplary embodiment of the present disclosure.

The unmanned aerial vehicle collaboration system may include a ground control system (GCS) 10 and a plurality of unmanned aerial vehicles (UAVs) 100A-100C. Although three UAVs 100A-100C are shown in the drawing for an example, the present disclosure is not limited thereto and the number of UAVs may be a larger or smaller than three.

The ground control system 10 may control a flight and a mission of the UAVs 100A-100C and receive captured images and/or sensor data from the UAVs 100A-100C while communicating with the UAVs 100A-100C. The communications between the ground control system 10 and the UAVs 100A-100C may be performed by using WiFi, Bluetooth, mobile communication according to LTE standard, for example, or another wireless communications scheme.

A control protocol for the ground control system 10 to control the UAVs 100A-100C through the wireless communication may be the Micro Air Vehicle Link (MAVLink) protocol which is a de facto standard for the unmanned aerial vehicles. Data packets exchanged through the MAVLink protocol have a very simple structure and may minimize computing resources and energy consumption of the UAVs 100A-100C. The ground control system 10 and each of the UAVs 100A-100C may specify an individual UAV using a system ID (SYS), a component ID (COMP), and a message ID (MSG) in data packets according to the MAVLink protocol to transmit and receive data to and from a specified communication counterpart UAV. Among the data transmitted and received between the ground control system 10 and the UAVs 100A-100C, control data may be transferred using a TCP protocol while image data or sensor data may be transferred using a UDP or TCP protocol, but the present disclosure is not limited thereto.

The UAVs 100A-100C may enhance a mission fulfillment efficiency through a collaboration. The term 'collaboration' used herein may refer to a sharing a mission or extending a geographical range of a common task. During the collaboration, the UAVs 100A-100C may communicate with each other by a device-to-device (D2D) communication. The term 'D2D communication' used herein may refer to a communication scheme in which the UAVs 100A-100C closely located geographically communicate with each other directly without an assistance of the ground control system 10. In an exemplary embodiment, the UAVs 100A-100C may perform data communications and measure a distance to the other communication counterpart by an ultra-wideband (UWB) communication.

According to the UWB communication, devices exchange data by transmitting and receiving impulses of which power spectral density is spread over a wide bandwidth, e.g. several gigahertz (GHz). The USB communication has advantages such as robustness to noise, low power consumption, and very high resolution in position detection. Thus, the UAVs 100A-100C may measure a distance to another UAV accurately by communicating with the corresponding UAV. In particular, according to the present disclosure, each of the UAVs 100A-100C communicate with another UAV while measuring the distance to the corresponding UAV by exchanging data in a form appended to a message frame associated with the distance measurement.

Figure 2:
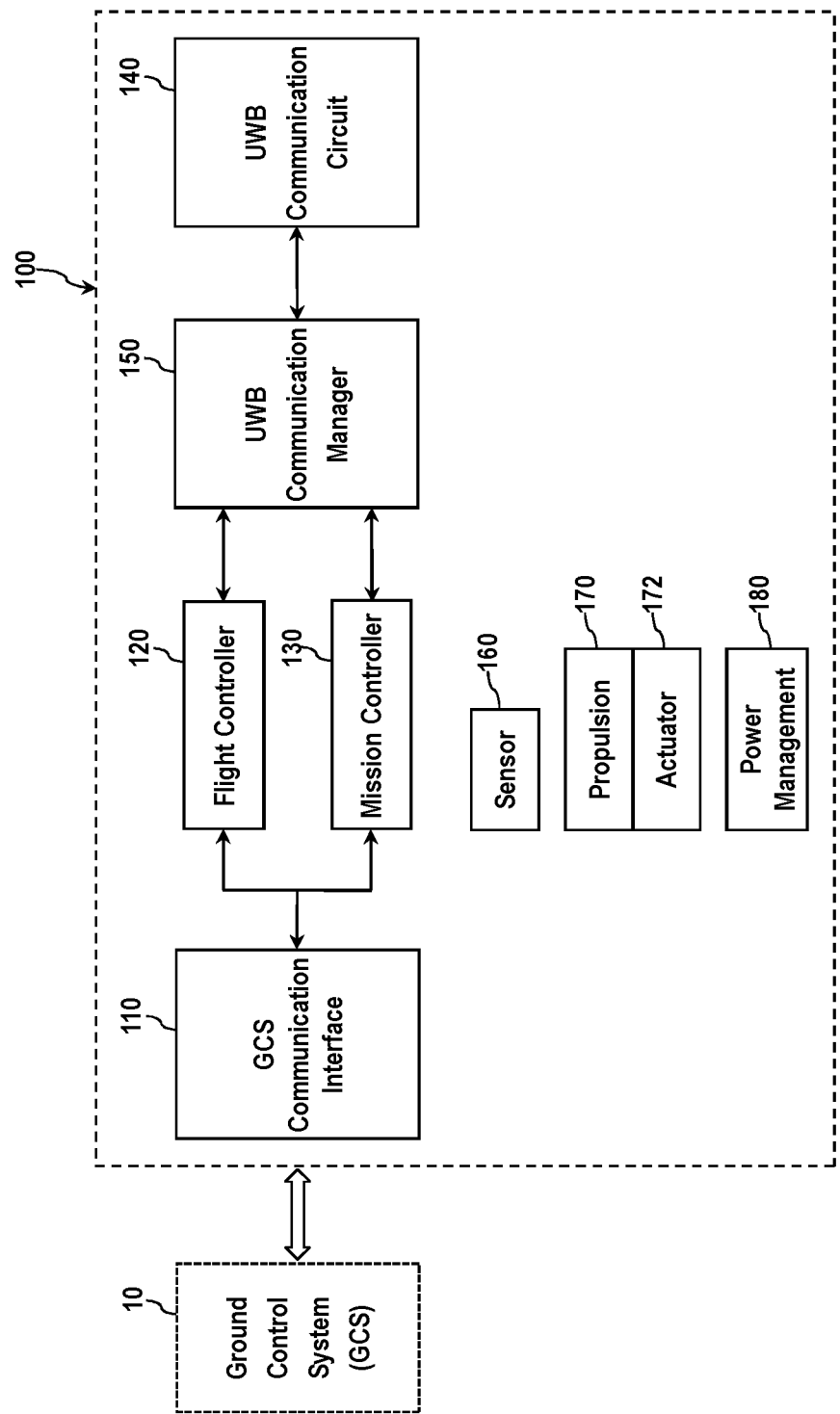
FIG. 2 is a block diagram of an unmanned aerial vehicle according to an exemplary embodiment of the present disclosure.

FIG. 2 is a block diagram of the UAV according to an exemplary embodiment of the present disclosure. The UAV 100 according to the present embodiment may include a GCS communication interface 110, a flight controller 120, a mission controller 130, a UWB communication circuit 140, a UWB communication manager 150, a sensors 160, a propulsion device 170, an actuator 172, and a power management unit 180.

The GCS communication interface 110 enables the UAV 100 to communicate with the ground control system 10. The GCS communication interface 110 may enable the flight controller 120 and/or the mission controller 130 to communicate with the ground control system 10 according to WiFi, Bluetooth, or another wireless communication protocol. In an exemplary embodiment, the flight controller 120 and/or the mission controller 130 may input or output data according to the MAVLink protocol, and thus the GCS communication interface 110 may allow the MAVLink data to be transmitted to or received from the ground control system 10 according to the wireless communication protocol. Among the MAVLink data, control data received by the UAV 100 from the ground control system 10 may follow the TCP protocol while image data and sensor data transmitted by the UAV 100 to the ground control system 10 may follow the UDP or TCP protocol, for example.

The flight controller 120 may control the propulsion device 170 and/or the actuator 172 to change a flight speed and/or direction of the UAV 100. The flight controller 120 may control the propulsion device 170 and/or the actuator 172 according to the control data received from the ground control system 10 through the GCS communication interface 110. In addition, the flight controller 120 may control the propulsion device 170 and/or the actuator 172 based on the sensor data detected by the sensors 160 so as to maintain a stable posture of the UAV 100.

The mission controller 130 provides computing resources required for the UAV 100 to carry out the mission. The operation of the mission controller 130 may be performed in response to a control command of the ground control system 10 or may be performed according to program instructions stored therein. Examples of the mission may include a specific task such as a capturing of monitoring images, an acquisition of the sensor data, and a spraying of fertilizer or firefighting water, as well as a monitoring and/or setting function such as a posture control and navigation, a monitoring of internal status as a battery charging level, a waypoint setting, and a geofence setting. In addition, the mission may include communications with the ground control system 10, an intermediation of communications between the ground control system 10 and the UWB communication manager 150, providing of control data to the flight controller 120, and transfer of acquired data to the ground control system 10, and storing of log data.

The UWB communication circuit 140 and the UWB communication manager 150 constitute a UWB communication module and perform UWB communication with other UAVs. In an exemplary embodiment, the UWB communication performed by the UWB communication circuit 140 and the UWB communication manager 150 enables both the data communications with another UAV and the measurement of the distance to the other UAV. In particular, the data communications with another UAV and the measurement of the distance to the other UAV may simultaneously be performed according to the present disclosure. The UWB communication module communicates with other UAVs in an asynchronous mode. During the communications, a signal reception function may operate all times while a signal transmission function may operate based on a clear channel assessment (CCA), that is, only when the channel is empty.

The UWB communication circuit 140 may receive transmit data from the UWB communication manager 150, modulate the transmit data, and generate and output a transmit radio signal. In addition, the UWB communication circuit 140 may receive a signal from another UAV, demodulate the received signal, and provide demodulated received data to the UWB communication manager 150. The UWB communication circuit 140 may include components corresponding to a physical layer for the UWB communication, such as a UWB antenna, a phase-locked loop (PLL), a modulator, and a demodulator. The UWB communication circuit 140 may be implemented using a commercially available UWB communication integrated circuit chip.

The UWB communication manager 150 may send or receive the data to or from other UAVs through the UWB communication circuit 140. The UWB communication manager 150 may be connected to an upper level device, i.e. the flight controller 120 and/or the mission controller 130, through a serial communication. The UWB communication manager 150 may be connected to the UWB communication circuit 140 through an inter-chip communication interface such as a serial peripheral interface (SPI). The UWB communication manager 150, which is a medium access control (MAC) layer communication device including a primitive session management capability, may provide basic medium access control (MAC) functions needed for the data transmission and reception and enable the D2D communication with another UAV without an assistance of the network environment). The UWB communication manager 150 may interpret messages received from the upper level device through the serial communication to instruct communications to the UWB communication circuit 140 or set communication parameters for the UWB communication circuit 140. In order to enable the collaboration with multiple other UAVs, the UWB communication manager 150 may manage a list of other UAVs capable of performing the UWB communication and perform a session management in a primitive form for the UWB communication based on the list.

When transmitting or receiving data through the UWB communication circuit 140, the UWB communication manager 150 may transmit or receive the data not only in a general form but also in a form that data to be shared by the UAVs are appended to at least one message frame associated with the distance measurement. As will be described later in more detail, the UWB communication manager 150 may support a custom protocol and a MAVlink protocol, and may provide MAVlink microservices by the session management method modified to be suitable for the collaborations of multiple UAVs according to the present disclosure.

The sensors 160 acquire information or measure physical quantities inside or around the UAV 100. The sensors 160 may include one or more of an image sensor, i.e., a camera, an infrared sensor, a gyro sensor and/or an acceleration sensor, a radar, a lidar, a GPS sensor, an ultrasonic sensor, a barometer, a magnetometer, and a rangefinder. The propulsion device 170 may be an engine or motor that provides a propulsion to change the position and/or orientation of the UAV 100. The actuator 172 may vary the propulsion of the propulsion device 170. The actuator 172 may include a transmission or a servo actuator, which may be provided separately for one or more of a propeller, a flap, a rudder, and a tail blade depending on the type of the propulsion device 170. The power management unit 180 may monitor the charging level of the battery and manage an energy consumption of the UAV 100.

The flight controller 120, the mission controller 130, and the UWB communication manager 150 may be implemented by hardware, software, or a combination of hardware and software. In an exemplary embodiment, the flight controller 120, the mission controller 130, and the UWB communication manager 150 may be implemented by separate processors and memories, and program instructions stored in respective memories and executable by respective processors. Alternatively, however, two or more of the flight controller 120, the mission controller 130, and the UWB communication manager 150 may be implemented based on the same hardware, that is, a processor and memory. The program instructions for implementing two or more of the flight controller 120, the mission controller 130, and the UWB communication manager 150 may be integrated into single software.

While the flight controller 120 and the mission controller 130 are shown to be in equal levels in the drawing, the flight controller 120 and the mission controller 130 may have a subordinate relationship. For example, while the mission controller 130 communicates with the ground control system 10 and the UWB communication manager 150, the flight controller 120 may operate under a control of the mission controller 130 or in response to a control signal received through the mission controller 130. Conversely, while the flight controller 120 communicates with the ground control system 10 and the UWB communication manager 150, the mission controller 130 may operate under a control of the flight controller 120 or in response to a control signal received through the flight controller 120. Meanwhile, the flight controller 120 and the mission controller 130 may be integrated into a single entity. In this specification including the appended claims, a combination of the flight controller 120 and the mission controller 130 may be referred to as a 'control unit'.

Figure 3:
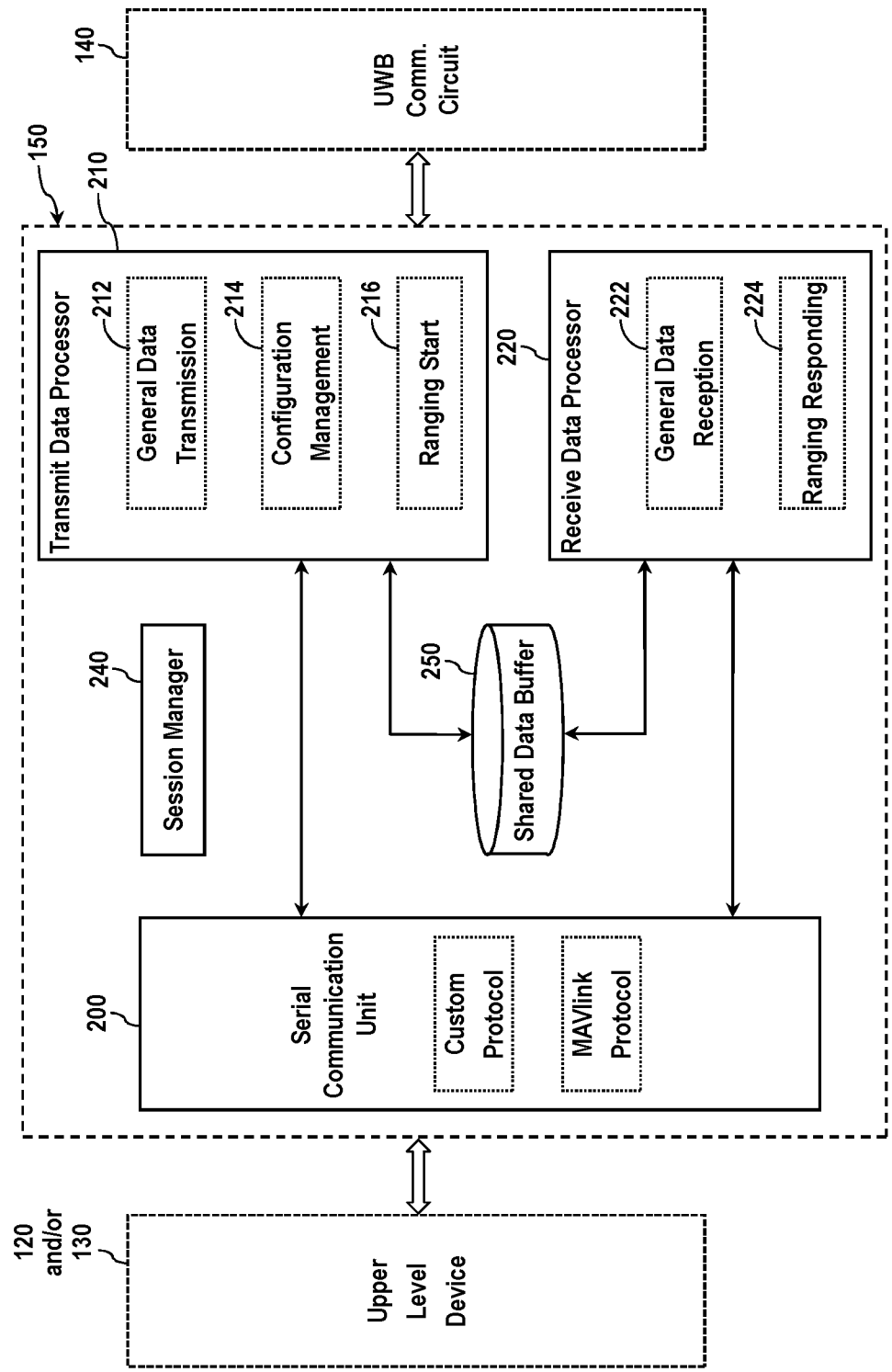
FIG. 3 is a detailed block diagram of an embodiment of a UWB communication manager shown in FIG. 2.

FIG. 3 is a detailed block diagram of an embodiment of the UWB communication manager 150 shown in FIG. 2.

The UWB communication manager 150 may include a serial communication unit 200, a transmit data processor 210, and a receive data processor 220. The UWB communication manager 150 may further include a session manager 240 and a shared data buffer 250 as subsystems for a specific service. The serial communication unit 200 and the receive data processor 220 may operate all the time. The transmit data processor 210 normally maintains a sleep mode and may wake up from the sleep mode to perform required operations only when necessary. For example, upon receiving a data transmission command, a distance measurement start command, or a configuration management command through the serial communication unit 200, the transmit data processor 210 may wake up temporarily to perform the operation instructed by the command and may enter the sleep mode again after performing the operation. While the transmit data processor 210 performs above operations, the operation of the receive data processor 220 may be paused.

The shared data buffer 250 may store data to be transmitted during a distance measurement process. The data to be stored in the shared data buffer 250 may be received from the upper level device, i.e., the flight controller 120 or the mission controller 130, through the serial communication unit 200 and may be provided to the transmit data processor 210. The data stored in the shared data buffer 250 may be transmitted to a communication device of another UAV by being appended to one of the message frames associated with the distance measurement.

The serial communication unit 200 may transfer a command received from the flight controller 120 or the mission controller 130 through the serial communication to the transmit data processor 210 or the receive data processor 220. In addition, the serial communication unit 200 may provide receive data, distance information, or set values acquired through the UWB communication to the flight controller 120 or the mission controller 130. Message protocols for the serial communication with the flight controller 120 or the mission controller 130 may include at least two protocols, that is, a custom protocol and a MAVlink protocol. The custom protocol refers to a protocol defined by a user and may be used for the communications with the mission controller 130 and setting of a parameters of the UAV. The MAVlink protocol may indicate an identification of the UAV, a message type, and a message to enable a variety of microservices such as a session management, uploading a task, and requesting a parameter.

The transmit data processor 210 may perform a general data transmission function 212, a configuration management function 214, and a ranging start function 216. The transmit data processor 210 normally maintains a sleep mode and may temporarily wake up from the sleep mode in response to the command received through the serial communication unit 200 and may enter the sleep mode again after performing the operation.

The general data transmission function 212 may refer to a transmission of data by the UWB communication, according to a transmit command from an upper level device, i.e., the flight controller 120 or the mission controller 130, to an address designated by the transmit command. A UWB frame may follow IEEE 802.15.4-2015 standard. In order to distinguish a general data frame from distance measurement frames, one byte of a payload in a standard frame may be defined and used as a payload type. In this specification including the appended claims, the term 'general data' may refer to data that is transmitted to a specific UAV or broadcasted to multiple UAVs but has nothing to do with the distance measurement. The general data may be divided into a simple transmission data and a transmission data requiring an acknowledgment. The transmission of the general data may involve a clear channel assessment (CCA) to search for a preamble code for a predetermined poll time and to send the data when the preamble code is not detected during the predetermined poll time. In case the preamble code is detected before the predetermined poll time expires, a back of such as an exponential backoff or a random backoff may be applied to avoid a recollision of transmissions. However, the types of the backoff is not limited thereto.

The distance measurement frames may include a poll frame, a response frame, and a report frame. The poll frame is included in a poll message which is sent by an initiator device to initiate the distance measurement process. The response frame is included in a response message which is sent by a responder device. The report frame is included in a report message which includes the distance value and is sent by the device.

The configuration management function 214 may include a modification of a configuration of the UWB communication circuit 140 such as an address of the UAV to which the transmit data processor 210 belongs or an acquisition of the configuration of the UWB communication circuit 140 to transfer to serial communication unit 200.

The ranging start function 216 may refer to a process of sending a distance measurement initiation frame or the poll frame for a single-sided two-way ranging (SS-TWR) to another UAV, receiving a response frame from the corresponding UAV, calculating a round trip delay to estimate a range (i.e., distance), and sending a report frame including an estimating range to the corresponding UAV. The transmit data processor 210 may apply a data sharing option while performing the ranging start function 214. The data sharing option refers to the transmission of the data stored in the shared data buffer 250 by appending to the distance measurement frames.

The receive data processor 220 may perform a general data reception function 222 and a ranging responding function 224. The receive data processor 220 may normally operate at all times. Thus, the receive data processor 220 may always check whether there is any data received by the UWB communication circuit 140.

When data is received through the UWB communication circuit 140, the receive data processor 220 may check a destination address in a header of the received data. If the destination address is its own address or a broadcast address, the receive data processor 220 may notify a source address of the data to the session manager 240 and process the data frame. If the destination address is neither its own address nor the broadcast address, the receive data processor 220 may discard the data frame after notifying the source address to the session manager 240.

The receive data processor 220 may check a payload type in the header of the received data frame and take different actions according to the payload type. In case the payload type indicates the simple transmission frame, the receive data processor 220 may forward the received data frame to the upper level device through the serial communication unit 200. In case the payload type indicates the transmission data frame requiring the acknowledgment, the receive data processor 220 may send an acknowledgement frame through the UWB communication circuit 140. Meanwhile, when the payload type indicates the poll frame for the single-sided two-way ranging (SS-TWR), the receive data processor 220 may send the response frame through the UWB communication circuit 140, receive a report frame, and provide distance information to the upper level device through the serial communication unit 200. In case the data sharing option is applied, the transmit data processor 210 may insert the data stored in the shared data buffer 250 into the response frame when transmitting the response frame, and the receive data processor 220 may acquire data contained in the received report frame together with the distance information to provide to the upper level device through the serial communication unit 200.

The session manager 240 may store and manage the list of other UAVs capable of performing the UWB communication in order to enable the collaboration with multiple other UAVs. In an exemplary embodiment, the session manager 240 may manage the list of the UAVs capable of performing the UWB communication and support the session management in a primitive form for the UWB communication which is much simpler than that the OSI 5-layer model. Each of the UAV addresses on the list registered in the session manager 240 may have a timer. As mentioned above, after the receive data processor 220 receives a new data frame, the session manager 240 may receive the source address in the data frame from the receive data processor 22 even if the data frame is not addressed to the UAV. If the source address of the received data frame is a new or inactive address, the session manager 240 may register the address in the list and set a timer for the address. Meanwhile, if the source address of the received data frame is already being managed, the session manager 240 may update the timer for the address. When a timer expires, the session manager 240 may determine that a connection with the other UAV associated with the expired timer is disconnected and may invalidate data received thereafter. The upper level device may check the addresses registered in the session manager 240 through the serial communication unit 200. That is, the session manager 240 may provide the upper level device with registered address information in response to a request of the upper level device.

The shared data buffer 250 may store the data to be added during the distance measurement process as described above. Since there may be insufficient time to request the data to be added to the frame from the upper level device during a frame exchange for the distance measurement, such data may be stored in the shared data buffer 250 in advance before the frame exchange for the distance measurement, so that data may be shared effectively.

Figure 4:
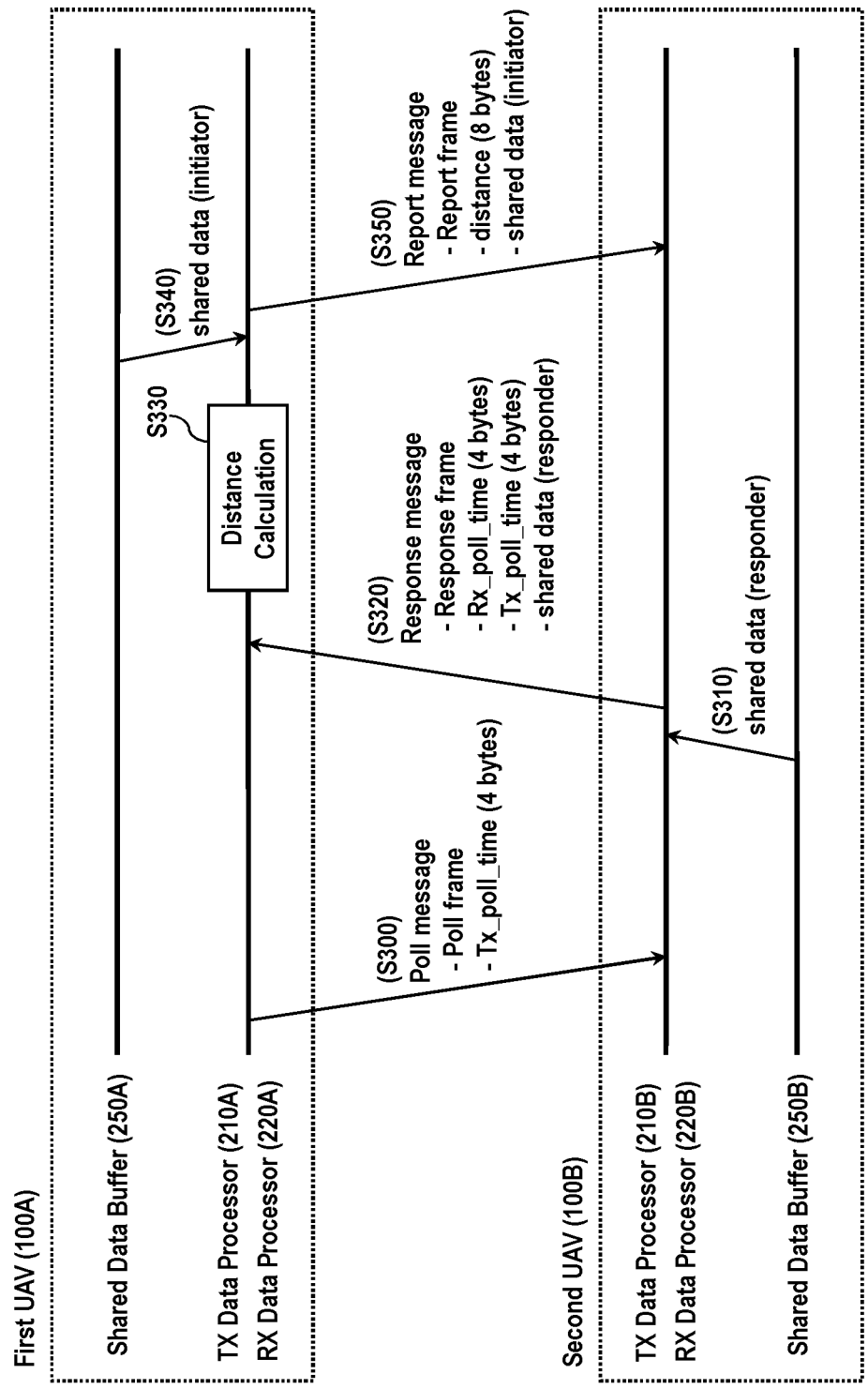
FIG. 4 is a sequence diagram showing an operation of data sharing and distance measurement using shared data buffers between two unmanned aerial vehicles.

FIG. 4 is a sequence diagram showing an operation of data sharing and distance measurement using shared data buffers 250A and 250B between two UAVs 100A and 100B. It is assumed that, in the drawing, a first UAV 100A acts as an initiator that transmits a message first, and a second UAV 100B acts as a responder that responds to the initiator. The shared data buffer 250A of the first UAV 100A may store the data to be shared with other UAVs, which is denoted by 'shared data (initiator)'. The shared data buffer 250B of the second UAV 100B may store the data to be shared with other UAVs, which is denoted by 'shared data (responder)'.

When the data sharing and the distance measurement are to be initiated, the transmit data processor 210A of the first UAV 100A may send a poll message including the poll frame and poll time information, Tx_poll_time, to the second UAV 100B (operation S300). When the receive data processor 220B of the second UAV 100B receives the poll message, the transmit data processor 210B of the second UAV 100B may read out the data, 'shared data (responder)', stored in the second shared data buffer 250B (operation S310), generate a response message by attaching the shared data to the poll frame, and send the response message to the first UAV 100A (operation S320).

Upon receiving the response message from the second UAV 100B, the receive data processor 220A or the transmit data processor 210A of the first UAV 100A may calculate a round trip delay and calculate the range (i.e. distance) between the first and second UAVs 100A and 100B (operation S330). In addition, the transmit data processor 210A of the first UAV 100A may generate the report frame including the distance value. The transmit data processor 210A of the first UAV 100A may read out the data, 'shared data (initiator)', stored in the first shared data buffer 250A (operation S340), generate a report message by attaching the shared data to the report frame, and send the report message to the second UAV 100B (operation S350).

On the other hand, the UWB communication manager 150 shown in FIG. 3 may apply the MAVlink protocol as mentioned above. The UWB communication manager 150 may be equipped with various communication schemes in addition to the MAVlink protocol. The microservices may be provided according to the MAVlink protocol and the various communication schemes applied to the UWB communication manager 150. For example, since a heartbeat exchange service, which is one of the microservices according to the MAVlink protocol and may be used for the session management, may not be suitable for an application to a multiple UAV systems, a new session management scheme may be applied according to an exemplary embodiment of the present disclosure. That is, contrary to a general heartbeat exchange in which an UAV transmits a heartbeat to the ground control system 10 and the ground control system 10 responds its heartbeat as an acknowledgement, multiple UAVs may periodically broadcast their heartbeats according to an exemplary embodiment. The session manager 240 maps and stores the source addresses of the UAVs 100 and a system identifier of the UAV system to which the UAVs 100 belongs, so that a current UAV equipped with the UWB communication manager 150 of the present disclosure may check whether it is possible for the current UAV having received a message to communicate with the UAV having send the message.

Besides, messages for a telemetry, a telecommand transmission, or a collaboration of multiple UAVs or identifiers indicating microservices may be included in the message frame. For example, an identifier for the telecommand that enables a measurement of the distance between UAVs may be indicated in the message frame. In such a case, through the data sharing and distance measurement function, two UAVs may measure the distance to each other while sharing the telecommand information with each other.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

In the above description, exemplary embodiments have been described with a focus on unmanned aerial vehicles, but the present invention is not limited thereto and can be similarly applied to other types of unmanned vehicles that operate while moving without a human on land, sea, or air. That is, the communication device according to an exemplary embodiment may be mounted on an unmanned vehicle and used to communicate with other unmanned vehicles, and may include a UWB communication circuit configured to perform a UWB communication with other unmanned vehicle; and a UWB communication manager configured to send transmit data to the other unmanned vehicle and receive data sent by the other unmanned vehicle through the UWB communication circuit and transmit or receive shared data to be shared by unmanned vehicles in the form of being appended to a distance measurement frame. The unmanned vehicle may be an unmanned aerial vehicle, and the other unmanned vehicle may be other unmanned aerial vehicle. Such implementation in other kinds of unmanned vehicles may be easily implemented based on this specification by those skilled in the art to which the present disclosure belongs, detailed descriptions thereof will be omitted.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A communication device of an unmanned aerial vehicle, comprising:
    an ultra-wideband (UWB) communication circuit configured to perform a UWB communication with other unmanned aerial vehicle; and
    a UWB communication manager configured to send transmit data to the other unmanned aerial vehicle and receive data sent by the other unmanned aerial vehicle through the UWB communication circuit, and transmit or receive shared data to be shared by unmanned aerial vehicles in a form of being appended to a distance measurement frame.

2. The communication device of claim 1, wherein the UWB communication manager comprises:
    a serial communication unit connected to a controller of the unmanned aerial vehicle through a serial communication;
    a transmit data processor configured to send a general data message including the transmit data to the other unmanned aerial vehicle through the UWB communication circuit according to an instruction from the controller and initiate a distance measurement to the other UAV;
    a receive data processor configured to receive a general receive data message sent by the other UAV and respond to a distance measurement procedure initiated by the other UAV; and
    a session manager configured to maintain and manage a list of unmanned aerial vehicles determined to be capable of performing the UWB communication and support a session management for the UWB communication.

3. The communication device of claim 2, wherein the receive data processor normally operates all the time, and the transmit data processor is activated only when data transmission is required.

4. The communication device of claim 2, further comprising:
a shared data buffer configured to store the shared data to be shared by the unmanned aerial vehicles to provide to the transmit data processor.

5. The communication device of claim 2, wherein message frames of the general data message and a distance measurement initiation message comprises payload type data for distinguishing the general data message from the distance measurement initiation message,
wherein the receive data processor provides the session manager with a source address of a received message when a destination address in a header of the received message is an address of the unmanned aerial vehicle itself comprising the receive data processor or a broadcast address.

6. The communication device of claim 2, wherein the session manager maintains a timer for determining whether a predetermined time has elapsed for each of the other unmanned aerial vehicles included in the list,
wherein an unmanned aerial vehicle from which any data has not been received within the predetermined time is excluded from the list,
wherein the timer for an unmanned aerial vehicle from which data has been received within the predetermined time is updated.

7. A communication method in an unmanned aerial vehicle, comprising:
sending a general data message comprising general data to other unmanned aerial vehicle through a ultra-wideband (UWB) communication, or receiving a general data message sent by the other unmanned aerial vehicle through the UWB communication;
transmitting a distance measurement initiation message to the other unmanned aerial vehicle;
receiving a response message to which responder device sharing data is attached from the other unmanned aerial vehicle;
calculating a distance to the other unmanned aerial vehicle based on a difference between a transmission time of the distance measurement initiation message and a reception time of the response message; and
generating a report message including the distance and initiator device sharing data to be shared with the other UAV and to transmit to the other UAV.

8. The communication method of claim 7, wherein message frames of the general data message and a distance measurement initiation message comprises payload type data for distinguishing the general data message from the distance measurement initiation message.

9. The communication method of claim 7, wherein the general data message comprises information for distinguishing the general data message from a message requiring a response.

10. The communication method of claim 7, further comprising:
storing, in a predetermined storage, a list of unmanned aerial vehicles capable of performing communications;
setting a timer for determining whether a predetermined time has elapsed for each of the unmanned aerial vehicles included in the list;
excluding an unmanned aerial vehicle, from the list, that has not received data within the predetermined time; and
updating the timer for the unmanned aerial vehicle from which data has been received within the predetermined time.

11. The communication method of claim 7, further comprising:
broadcasting heartbeats to a plurality of unmanned aerial vehicles periodically.

12. The communication method of claim 7, further comprising:
detecting a system identifier included in a received message and determining whether the system identifier is identical to an identifier of a system to which the unmanned aerial vehicle belongs.

13. The communication method of claim 12, wherein at least one of the distance measurement initiation message, the response message, and the report message comprises a service identifier indicating a service to be provided through a collaboration of a plurality of unmanned aerial vehicles.

14. An unmanned aerial vehicle capable of performing device-to-device communications with other unmanned aerial vehicles belonging to an unmanned aerial vehicle collaboration system including a plurality of unmanned aerial vehicles, comprising:
a controller configured to control a flight and a mission fulfillment of the unmanned aerial vehicle;
a communication unit configured to enable the controller to communicate with a predetermined ground control system;
an ultra-wideband (UWB) communication circuit configured to perform UWB communications with the other unmanned aerial vehicles; and
a UWB communication manager configured to send transmit data to at least one of the other unmanned aerial vehicles and receive data sent by the other unmanned aerial vehicles through the UWB communication circuit, and transmit or receive shared data to be shared by the unmanned aerial vehicles in a form of being appended to a distance measurement frame.

15. The unmanned aerial vehicle of claim 14, wherein the UWB communication manager comprises:
a serial communication unit connected to the controller through a serial communication;
a transmit data processor configured to send a general data message including the transmit data to at least one of the other unmanned aerial vehicles through the UWB communication circuit according to an instruction from the controller and send a distance measurement initiation message to at least one of the other unmanned aerial vehicles;
a receive data processor configured to receive a general data message sent by at least one of the other unmanned aerial vehicles and respond to a received distance measurement initiation message from at least one of the other unmanned aerial vehicles; and
a session manager configured to maintain and manage a list of unmanned aerial vehicles determined to be capable of performing the UWB communication and support a session management for the UWB communication of the unmanned aerial vehicle.

16. The unmanned aerial vehicle of claim 15, wherein the receive data processor normally operates all the time, and the transmit data processor is activated only when data transmission is required.

17. The unmanned aerial vehicle of claim 15, further comprising:
- a shared data buffer configured to store the shared data to be shared by the unmanned aerial vehicles to provide to the transmit data processor.

18. The unmanned aerial vehicle of claim 15, wherein message frames of the general data message and the distance measurement initiation message comprises payload type data for distinguishing the general data message from the distance measurement initiation message,
- wherein the receive data processor provides the session manager with a source address of a received message when a destination address in a header of the received message is an address of the unmanned aerial vehicle itself comprising the receive data processor or a broadcast address.

19. The unmanned aerial vehicle of claim 18, wherein the session manager maintains a timer for determining whether a predetermined time has elapsed for each of the other unmanned aerial vehicles included in the list,
- wherein an unmanned aerial vehicle from which any data has not been received within the predetermined time is excluded from the list,
- wherein the timer for an unmanned aerial vehicle from which data has been received within the predetermined time is updated.

* * * * *